United States Patent
Freyssinet et al.

(10) Patent No.: US 6,477,564 B1
(45) Date of Patent: Nov. 5, 2002

(54) PROCESS FOR TRANSFORMING AND ROUTING DATA BETWEEN AGENT SERVERS PRESENT IN SOME MACHINES AND A CENTRAL AGENT SERVER PRESENT IN ANOTHER MACHINE

(75) Inventors: Andre Freyssinet, Claix (FR); Marc Herrmann, Saint-Etienne de Crossey (FR); Serge Lacourte, Saint-Martin d'Heres (FR)

(73) Assignees: Bull S.A., Louveciennes (FR); Inria, Le Chesnay (FR)

( * ) Notice: Subject to any disclaimer, the term of this patent is extended or adjusted under 35 U.S.C. 154(b) by 0 days.

(21) Appl. No.: 09/332,999

(22) Filed: Jun. 15, 1999

(30) Foreign Application Priority Data

Jun. 18, 1998 (FR) .............................. 98 07718

(51) Int. Cl.[7] .............................. G06F 15/16
(52) U.S. Cl. .................. 709/202; 709/102; 709/314
(58) Field of Search ................. 709/102, 202, 709/217, 219, 314, 318, 238

(56) References Cited

U.S. PATENT DOCUMENTS

| | | | | |
|---|---|---|---|---|
| 5,706,516 A | * | 1/1998 | Chang et al. ............... | 709/314 |
| 6,052,363 A | * | 4/2000 | Koch ......................... | 370/252 |
| 6,108,782 A | * | 8/2000 | Fletcher et al. ............ | 713/153 |
| 6,292,827 B1 | * | 9/2001 | Raz ............................ | 709/217 |
| 6,327,630 B1 | * | 12/2001 | Carroll et al. .............. | 709/314 |

FOREIGN PATENT DOCUMENTS

| | | |
|---|---|---|
| EP | 0723236 | 7/1996 |
| EP | 0817042 | 1/1998 |
| WO | 9510805 | 4/1995 |

* cited by examiner

*Primary Examiner*—Ayaz Sheikh
*Assistant Examiner*—Philip B. Tran
(74) *Attorney, Agent, or Firm*—Miles & Stockbridge PC; Edward J. Kondracki

(57) ABSTRACT

The present invention relates to a process for transforming and routing data between agent servers present in some machines and a central agent server present in another machine. The agent server comprises autonomous agents (5) that communicate via notifications, a storage layer and an agent machine comprising an execution engine, a communication channel and two message queues for the notifications, a local queue (mqIn) and an external queue (mqOut). The execution engine takes a notification in the local queue, determines and loads the corresponding agent for each notification, has the agent react to the notification, which agent can then change its status and/or send notifications to the communication channel (2), which stores them in the local queue if they are addressed to a local agent and in the external queue if they are addressed to an agent of another server.

14 Claims, 3 Drawing Sheets

```
class Agent {
  React(Notification)  throw Exc;
  Save()  throw Exc;
  Load(AgentId)  throw Exc;
};
```

FIG. 3

```
class Channel {
  SendTo(AgentId, Notification) throw Exc;
};
```

FIG. 4

```
Class messageQueue {
  Push(AgentId, Notification) throw Exc;
  Get(AgentId, Notification) throw Exc;
  Pop() throw Exc;
};
```

FIG. 5

PROCESS FOR TRANSFORMING AND ROUTING DATA BETWEEN AGENT SERVERS PRESENT IN SOME MACHINES AND A CENTRAL AGENT SERVER PRESENT IN ANOTHER MACHINE

BACKGROUND OF THE INVENTION

1. Field of the Invention

The invention relates to a process for transforming and routing data between agent servers present in some machines and a central agent server present in another machine.

More specifically, the invention relates to a process for transforming and routing data between agent servers present in machines of production sites and a central agent server present in the machine of the decision-making base, for example within the framework of a centralized concentration of data, also known as a Data Warehouse.

2. Description of Related Art

Data Warehousing is a computing concept aimed at concentrating in a centralized unit, accessible through a network, all of the information available in a company. Data Warehousing allows a better distribution of the information by no longer presenting the information in the form of raw data, but so that it is directly usable by the requestor or client (the company's executives, for example). A Data Warehouse therefore corresponds to one or more of the company's production sites with databases, plus a decision-making base that can retrieve the information in a new form (matching information that can be represented in different ways, transforming or deleting information, etc.). At each site, there is a process for transforming and routing the data for filling this decision-making base. The hardware and software used can be different from one site to another. In the prior art, the machines at each site require a particular software program for interpreting and transforming the information from the database or databases of the site. A software program must therefore be rewritten for each site. The processes that currently exist use the distribution to the various machines of a synchronous process known as a Remote Procedure Call (RPC). The various elementary operations (the extraction, transfer and loading stages) are mixed in one algorithm.

SUMMARY OF THE INVENTION

The object of the invention is to restructure the data transforming and routing software in order to make it easily extendable and to make it open.

This object is achieved through the fact that the process for transforming and routing data between agent servers present in some machines and a central agent server present in another machine is characterized in that an agent server comprises autonomous agents that communicate via notifications, a storage layer (Storage) and an agent machine comprising an execution engine (Engine), a communication channel (Channel) and two message queues for the notifications, a local queue (mqIn) and an external queue (mqOut), and in that the execution engine takes a notification from the local queue (mqIn), determines and loads the corresponding agent for each notification, has the agent react to the notification, which agent can then change its status and/or send notifications to the communication channel, which stores them in the local queue (MqIn) if they are addressed to a local agent and in the external queue (MqOut) if they are addressed to an agent of another server.

According to one characteristic, the execution engine (Engine) of the agent machine executes, after the agent's reaction, a save (Save) of the agent's status, a deletion (Pop) of the processed notification from the local message queue (MqIn) and, atomically, a validation (Commit), of the various operations performed that have changed either the status of the agent or the status of the message queues.

According to another characteristic, each message includes an optimized matrix clock that can be read by the execution engine of the agent machine, thus making it possible to process the notifications in their causal sending order.

According to another characteristic, a message is an object that contains four pieces of information, i.e., the identifier of the sending agent, the identifier of the destination agent, a clock and the notification.

According to another characteristic, the agent machine controls the distribution to all the entities of the network, the reliability of the operations and the scheduling of the messages, which is established by incrementing a logical matrix clock.

According to another characteristic, the message channel performs the following separate transactions:
  a notification sent by an agent is stored locally in a message queue, i.e., either the local queue (mqIn) for the notifications addressed to a local agent, or the external queue (mqOut) for an agent located in another server;
  at the end of the agent's reaction, the two queues are saved on the disk, together with the reacting agent;
  a function (handleout) of the network extracts each notification, in turn, from the external queue (mqOut) and sends it to the target agent server;
  a function (handlein) of the network receives the notifications from the other servers and inserts them into the local queue (mqIn) in causal order.

According to another characteristic, a target agent server receives a message, stores it in its persistent storage layer (Storage), validates the operation (Commit) and confirms the reception of the message to the source server; upon reception of this confirmation, the source server deletes the message from its external queue (mqOut).

According to another characteristic, a persistent external service ensures the atomic nature of the operations that have changed either the status of the agent or the status of the message queues (3,4).

According to another characteristic, the execution engine:
  takes a notification that is in the queue, using the Get function,
  sees which agent the notification is addressed to,
  loads the agent corresponding to the notification (Load),
  has the agent react by calling a reaction operation (React); the agent can change its status by modifying its image in memory, and can send notifications by addressing the channel that will distribute the notification, in which case the notifications are routed to a message queue where they are stored in chronological order,
  if the reaction operation is executed, saves (Save) the status of the agent, which has been changed by the reaction it has executed, deletes (Pop) the notification that has been processed, and atomically validates all of the operations that have been performed (Commit),
  starts again in the program loop in order to process another notification.

According to another characteristic, the data transforming and routing process is executed between agent servers present in machines of production sites and a central server present in the machine of a decision-making base, and uses a particular agent (Event) describing the specific events, in which a status automation is implemented.

According to another characteristic, the status controller comprises various statuses:

a None status in which the event is not active, a notification (Schedule) causes the event to pass into the Wait status in which the event waits for its activation condition to become true; the event delivers itself a notification that changes it to the Init status;

a simple event attains the Run status directly and ail executes its action; a composed event signals to its sub-events its agreement for them to start and waits for the first of them to attain the Run status in order to pass into the Run status itself;

a simple event then passes into the Done or Fail status, depending on the status of its action; for a composed event, this change depends on the execution statuses of all the sub-events;

a event in execution can be killed by sending it a notification (Eventkill), in which case it passes into the Kill status, marking the fact that it has been killed, and then to the Stop status when it has actually been killed;

a terminated event, i.e., in the Done, Fail or Stop status, can be re-executed by the client by sending it a notification (Schedule), in which case it is reset and passes into the Wait status; the event then propagates the notification to all the sub-events; an event executed repeatedly and endowed with a Done status is automatically reset by the agent Scheduler, which sends it a notification (Schedule);

an event in the Fail or Stop status can be re-executed without being reset by sending a notification (Eventrestart); when this condition becomes "true," the event restarts at the point at which it was previously stopped.

According to another characteristic, a new function can be added to the architecture by adding an agent class derived from the class "Event."

According to another characteristic, three categories of "Event" type agents—"SeqEvent," "ParEvent," "ComplexEvent"—type take on other elementary operations of the "Event" type in order to respectively execute them in sequence, in parallel or in accordance with the dependencies between the various operations.

BRIEF DESCRIPTION OF THE DRAWING

By Other characteristics and advantages of the present invention will emerge more clearly through the reading of the following description provided in reference to the appended drawings, in which:

FIGS. 3, 4 and 5 respectively represent the class "Agent, "the class "Channel," and the class "messageQueue."

DESCRIPTION OF THE DRAWINGS

Figure 1:
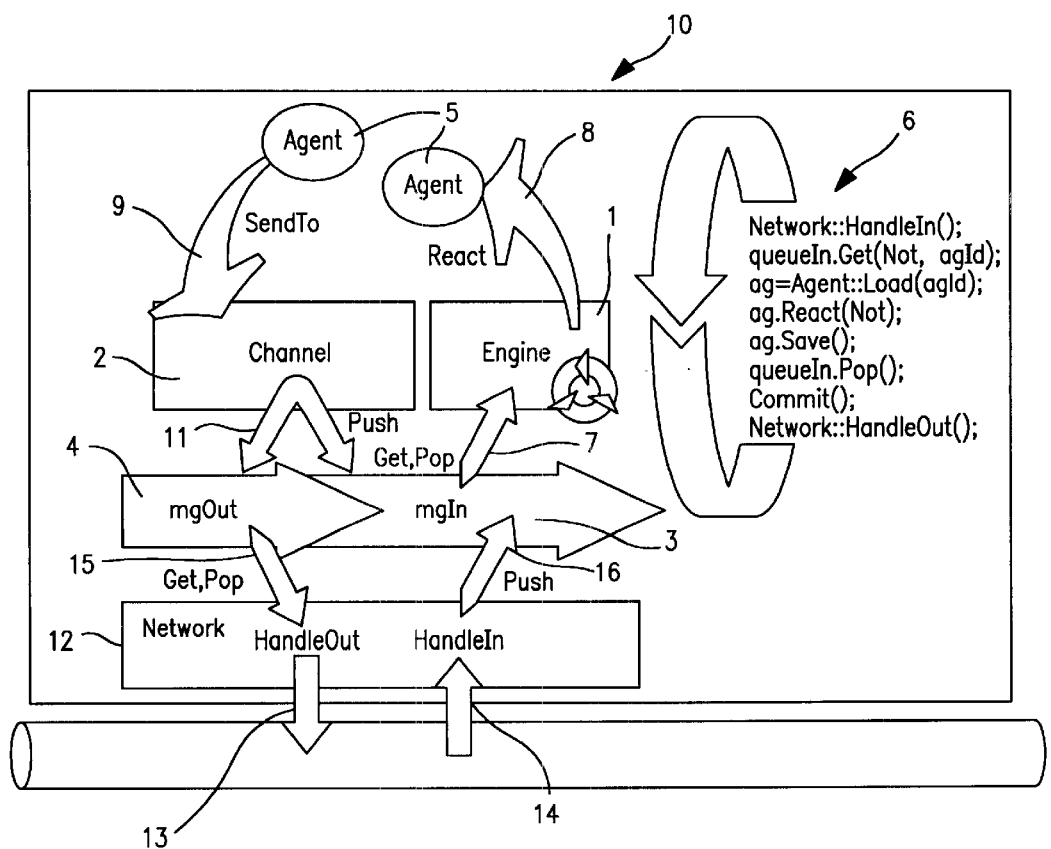
FIG. 1 represents the architecture of an agent server at a site and the algorithm of the execution engine of the agent machine.

Schematically, at each production site, there are one or more machines constituted by an agent server. The communications between the agent servers are established through a network, for example a component Network. In each agent server, an agent machine is defined, which in turn has the capability to define agents, with a certain agent model. This agent machine manages a certain number of properties, which include the atomic aspect of an agent's reaction to a notification and the delivery of notifications in a causal sending order. The agent machine comprises various entities. In reference to FIG. 1, the agent machine comprises an execution engine (1) (Engine), a communication channel or message bus (2) (Channel) associated with the execution engine (1), the channel (2) having two queues, a local queue (3) (mqIn) and an external queue (4) (MqOut). The agent server (10) also includes a storage layer (Storage). The queues (3, 4), the channel (2) and the agents (5) are supported by the storage layer.

All the agents (5), the communication channel (2) and the execution engine (1) of the agent machine are C++ objects in a UNIX process. Persistence is obtained by using a DBMS (Data Base Management System). Most of the objects, and not just the agents, can be stored in the persistent storage layer. Each object has a unique, persistent identifier. The objects are compatible with a generic interface in order to be used by common, persistent service functions.

The agents (5) are elementary programming and execution entities. The agents (5) are autonomous in order to give the structure the property of extendibility by making it easy to add and remove agents within the architecture. They are made autonomous by correctly defining the interface of these agents. They are also autonomous in terms of communication. They communicate using notifications and not procedure calls, which makes it possible to open up the architecture. An event is represented by a notification. The notifications pass through the channel (2) and are controlled by the execution engine (1) (Engine) of the agent machine. The notifications are delivered to the agents via the communication channel (2) (Channel). The agents (5) are persistent objects, their status is determined by data that exists outside any execution structure. An agent (5) is an independent machine that reacts to the notifications. All the agents are independent and only the reacting agents need to be loaded into the memory. A "reacting agent" is an agent that has just received a notification, and whose behavior is imposed by the "React" function of the agent called by the execution engine (1) (Engine). These reacting agents can then be replaced on the disk at the end of the program loop of the execution engine (1), which is described below. Each agent is an object of a class and is identified by an unique identifier (Agent Id) which makes it possible to locate it. An agent can be created in a remote server. The creation entity is responsible for creating the identifier. The structure of the identifier must take into account the static location of the agents in order to allow the system to keep track of the notifications and to allow local "production" of identifiers for the remote agents. The identifier of an agent comprises three parts, i.e., the identification of the agent server hosting the creation agent, the identification of the agent server hosting the agent created, and a stamp, local to the agent server hosting the creation agent.

The persistent objects are divided into four classes. All of the objects having the same properties or the same policy for allocating identifiers belong to one class. A defined class can be reused to define a sub-class by adding specific properties to it. The sub-classes inherit properties from the superclass. An inheritance graph defines the hierarchy of the classes. Four basic classes are also defined, the class "globalObject," the class "localObject," the class "notification," and the class "agent."

The objects of the class "globalObject" represent the configuration data defined by the client at the time of the configuration and shared by the various events. Two main categories are described, the hosts in the class "Host" and the derived classes, and the databases in the class "DbConfig" and the derived classes. An object of the class "DbConfig" always points to an object of the class "Host."

The class "localObject" has been defined so as to provide flexibility in the management of persistence. The interface for persistence imposes the movements of all of the objects from the storage layer (storage) to the memory and from the memory to the storage layer, even if some of the objects have not changed during the reaction. Declaring a member of an object in this class makes it possible to explicitly manage the persistence of this member, independently of the persistence of the object itself.

The objects of the class "notification" represent the messages exchanged by the agents. Most of the notifications relate to the management of "warehouse" events.

The agent class represents the "warehouse" events. The object class "Agent" defines the generic interface for all the agents. The object class "Agent" defines the common behavior of all the agents. Each agent is an object of one of the classes derived from the agent class. The agent class provides a mechanism ("swap-in/swap-out") that makes it possible to load the agents or to find them in main storage in order to activate them and to dump the agents not used since a given moment. This is performed by a class "AgentHashTable," which maintains a list of the agents already in memory with the date of their last access. This class is created using a table (Hashtable) with the agent identifier in the first position. The agents can be explicitly deleted from the memory by a "Delete" function which deletes them from the table (Hashtable). In reference to FIG. 3, the object class "Agent" (20) defines two functions, the "Save" function and the "Load" function, which saves and loads the status of the objects into and out of auxiliary storage. The agents, identified by their identifiers, are loaded automatically by the execution engine (1). The reactive behavior is implemented by a "React" function, which defines the reaction of an agent when it receives a notification. This function is called by the execution engine (1) of the agent machine.

A first type of "Agenda" or "scheduler" agent (Scheduler) manages the chronological execution of "warehouse" queries. This agent is activated by the reception of a notification (Schedule) (32). This agent reacts to this notification by selecting the agents it must reactivate by sending an agreement notification (AgreementScheduler). It manages the time and the alarms, and the agents can request to be "reactivated" at a certain time. This agent is present only in the central agent server of the decision-making base.

A second type of agent "factory" (factory) is present in all the agent servers and is responsible for creating objects in the server. It makes it possible to manage the creation of agents remotely.

A third and a fourth type of agent "UnixEvent" and "SigChild" make it possible to manage UNIX processes. "Sigehild" exists in a UNIX agent server and captures the termination signals of "child" processes.

A fifth type of agent "Clientproxy" makes it possible to transcribe commands ordered by a client into notifications. It exists only in the central agent server and supports the relationship with the client.

An agent class "Event" describes the "warehouse" events. A "warehouse" query is composed of several elementary tasks called By "warehouse" events. In this agent architecture, each event is executed and controlled by a separate agent. All the "warehouse" events have a behavior an properties in common, which results in a more precise definition of a type of agent specific to the Data Warehouse: the agent Event. It must be compatible with a certain interface and a mode of operation. Like any agent, it is a status machine, but in this case the statuses are defined. An object "Event" differs from an object "Agent" by the following attributes:

an event has a name and a description;

all the events that form a "warehouse" query are organized hierarchically. The query is identified by an identifier of the event at the root of the hierarchy, and all of the events retain the identifier of their parents and their query;

the purpose of an Event is to accomplish an action. The start of the execution of the action is conditioned by the reception of a series of agreement notifications (Agreement) (34);

an object Event uses lists (tables) and produces lists resulting from an extraction, transfer, or transformation operation, for example. The tables produced are established with the notification of the termination of the event's action (ActionDone) (44), and are represented by C++ objects in the class localObject;

an object Event is a status machine; it maintains a status variable and reports changes in its status to its parents by means of notifications (StatusNotification) (45).

Two main groups of events can be isolated. A basic class (DelegatingEvent) is defined for all the events that perform an elementary operation specific to Data Warehousing: extraction, transfer, transformation, etc. These various operations inherit from the agent Event all the properties of this object. A second basic class of service (ComposedEvent) helps to structure the execution of a query: a sequential, parallel, or more complex execution. This class defines a common behavior for all the composed events such as, for example, the management of the list of sub-events; create, save, restore, delete.

The last important event is the UnixEvent, which includes the execution of a Unix command.

Figure 2:
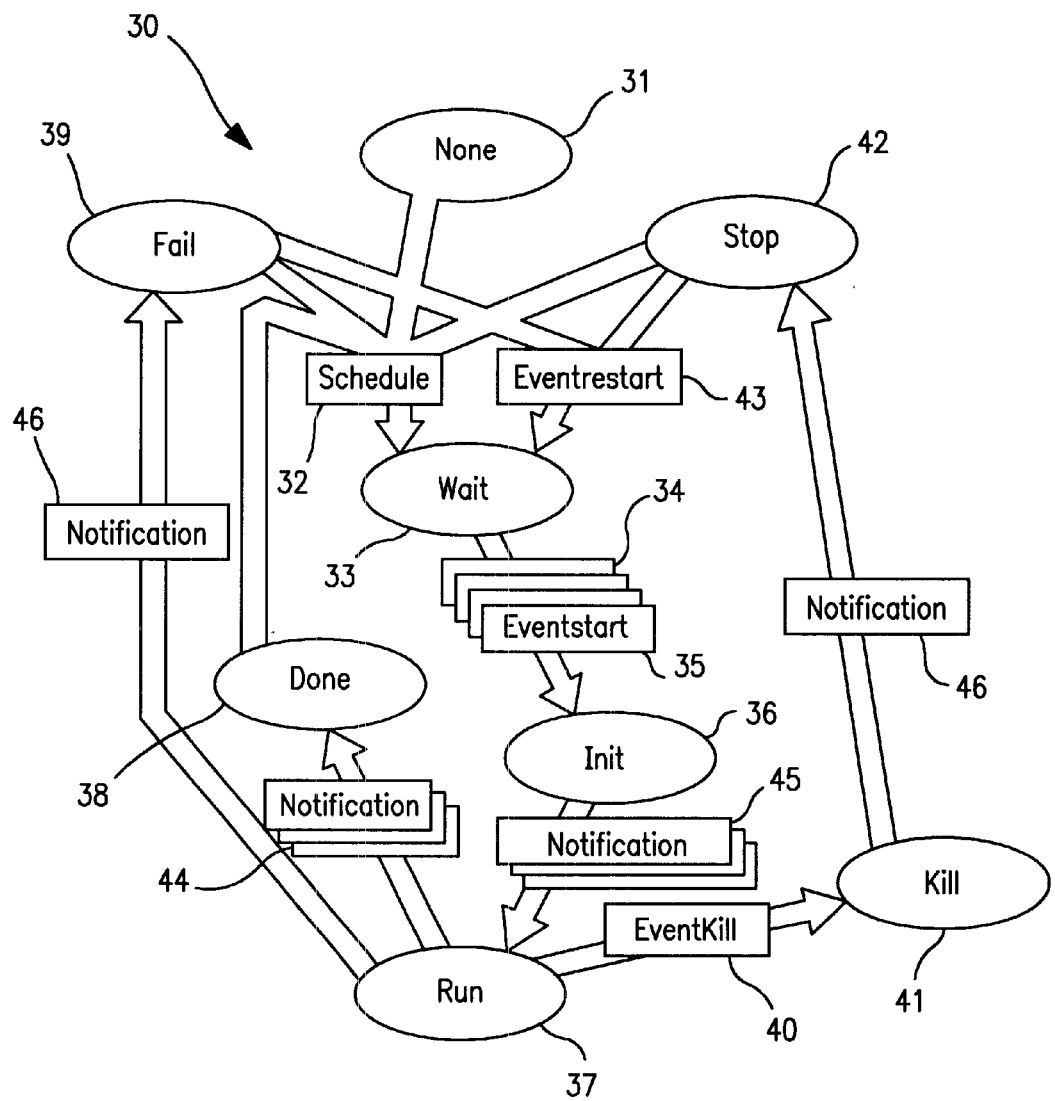
FIG. 2 represents the status controller of an agent "Event"

The status changes possible during the execution of the event are represent in FIG. 2. The status graph or status controller (30) is implemented in the agent EVENT in C++:

the None status (3) is the initial status in which the event is not active;

a notification (Schedule) (32) causes the event to pass into the Wait status (33) in which the event waits for its activation condition to be come true (True). This condition depends on a series of agreement notifications (Agreement) (34). When this condition becomes true, i.e., when all the agreements have been received, the event delivers itself a notification (Eventstart) (35) in order to start;

upon reception of this notification (Eventstart) (35), the status is set to Init (36);

a simple event attains the Run status (37) directly and executes its action. A composed event signals to its sub-events its agreement for them to start, and waits for the first of them to achieve the Run status (37) (it waits for the action to have actually started);

a simple event passes into the Done (38) or Fail (39) status, depending on the status of its action, upon reception of a notification that the event delivers to itself (respectively 44, 46). For a composed event, this change depends on the execution statuses of all the sub-events;

an event in execution can be killed by sending it a notification (Eventkill) (40), in which case it passes into the Kill status (41), marking that it has been killed, and then to the Stop status (42) when it has actually been killed, upon reception of a notification (46);

a terminated event, i.e., in the Done (38), Fail (39) or Stop (42) status, can be re-executed by the client by sending it a notification (Schedule) (32).

an even in the Fail (39) or Stop (42) status can be re-executed without being reset by sending a notification (Eventrestart) (43). When this condition again becomes "true," the event restarts at the point at which it was previously stopped.

In the class "Event," a function (Start) makes it possible to change the status and to automatically send the status change to the operation that manages the operation. The "Start" function makes it possible, simply by calling it, to send the necessary notifications automatically and to change the status. The class has a basic implementation for reactions to a certain number of notifications. In particular, there is a procedure in the basic class Event for changing from Wait (33) to Init (36). An agent that inherits from Event, i.e., that is part of a sub-class of the class "Event," retains this management. In the standard mode, the status changes to Init (36), then to Run (37), then to Done (38); from Done (38), the status can return to Wait (33). This is the standard schema. The basic implementation is Wait (33), Init (36), Run (37). In more specific classes, it is necessary to control the change from Init (36) to Run (37) manually. There is a basic implementation for reacting to a stop request signal (40). Upon reception of this Kill notification (41), it will change to the Kill status (41), then to the Stop status (42). This implementation can, for example, be loaded into a sub-class; it is possible in the sub-class to provide another function that will implement this change, possibly separating it into two stages, from Run (37) to Kill (41), then from Kill (41) to Stop (42). There is therefore a basic implementation for all these status changes. When wishing to define a particular class, it is necessary to override the class Event and to provide a implementation with a certain number of functions that follow its rules, and each function, for example the Start function, must necessarily call the change to the Run status (37). In a class, there are variables, each of which contains one of the statuses, and status change functions, each of which triggers the change, for example from Wait (33) to Run (37) or from Run (37) to Done (38). In the class Event, a standard layout is provided, which makes it possible to change directly from Init (36) to Run (37), but a class that is going override it must provide the implementation for the Start function by placing in its code the change from Init (36), followed by the change to Run (37). Thus, introducing a new agent class amounts to inheriting, then providing implementation for new functions, in other words, adding a new function to the architecture amounts to adding an agent class derived from the class Event.

The data transfer process is broken down into elementary tasks which pass through the statuses described above; thus, the execution progresses in elementary steps. Each elementary operation must satisfy the status graph. When, for example, a service is requested of an elementary operation, the operation will pass into Wait (33) and Init (36), and the agent machine (which is described below) guarantees that the operation attains, at a given moment, the Done status (38) or the Fail status (39), or possibly, if a stop request (30) has been requested, the Stop status (42). The organization and synchronization of the elementary tasks are part of a library. Three particular agent classes, "SeqEvent," "ParEvent," and "ComplexEvent," which inherit from the class "ComposedEvent," have been created. An object "SeqEvent" executes its sub-events in sequential order. It reacts to a notification "EventStart" by sending its agreement to the first of its sub-events. When the latter is finished, it passes to the Done status (38). If one of the sub-events fails, the object "SeqEvent" stops and passes into the Fail status (39).

In the same way, an object "ParEvent" executes its sub-events in parallel. It reacts to the notification Eventstart by sending its agreement to all the sub-events. It waits until they are finished and changes its status as a function of their ending statuses. An object "Complex Event" makes it possible for arbitrary dependencies to be set between sub-events. Since each event or elementary operation, or each "Event," must comply with the status graph, it is possible to construct an event that will manipulate sub-events of an unknown type, but which are known to comply with this graph, so that they are executed sequentially. It is possible to start two operations in parallel, for example two extractions that do not involve the same databases and the same sites, and to re-synchronize at the end of these two operations in order to start another operation, for example a transformation. Adding parallel management, for example, while maintaining the reliability of the agent machine (which is described below) is possible as a result of the open and extendable architecture of the process. Thus, different services can be added to the machine simply by adding a class.

The agent machine ensures the distribution of the notifications, the transmission of notifications, and the management of the atomicity of all the operations. The agent machine comprises various entities. In reference to FIG. 1, the agent machine comprises an execution engine (1) (Engine), a communication channel (2) (Channel) associated with the execution engine (1), the channel (2) having two queues, a local queue (3) (mqIn) and an external queue (4) (MqOut). There are well-defined entities and the program (6) of the execution engine (1) uses these various entities.

The interface of the communication channel (2) (Channel) is provided by the class "Channel." According to FIG. 4, the class "Channel" (21) defines a function (Sendto), which sends a notification to an identified agent. The object "Channel" is responsible for the target agent. The object "Channel" provides the following properties: a notification accepted by the channel (2) (Channel) is sent at some point, and two notifications with identical source and target agents are sent in order of their emission.

According to FIG. 5, the class "MessageQueue" (22) defines an addition function (Push) used by the object "Channel" to add a notification to a queue, and two functions (Get and Pop) used by the execution engine (1).

The execution engine (1) is provided by the class "Engine." The class "Engine" is the main part of the architecture. This class "Engine" provides a multiprogramming of the agents. The distributed architecture involves several agent servers running on different machines. Each agent is attached to only one agent server, the migrating entities being the notifications. One of the essential properties of the execution machine in an agent server is the transactional execution of an agent reacting to a notification: either all of the actions, i.e., the notifications sent and the status changes of the agents, are executed, or none of the operations are executed. Each object of the class "Engine"

is associated with an object of the class "MessageQueue" defined when the object "Engine" is created. The execution engine (1) (Engine) provides a program loop (6) which successively takes the notifications from the local message queue (3), and calls and executes the appropriate reaction function (React) of the target agent.

In reference to the algorithm (6), of the execution engine (1) (Engine) represented in FIG. 1,

- the execution engine (1) takes a notification that is in the local queue (4) using the Get function (7);
- the execution engine (1) sees which agent the notification is addressed to;
- the execution engine (1) loads the agent that corresponds to the notification (Load);
- the execution engine (1) has the agent react by calling a reaction operation (React) (8). The agent can change its status, i.e., modify its image in memory, and can send (9) notifications, i.e., address the channel (2), which will distribute (11) the notification. The notifications are then routed to a message queue (3, 4) or they are stored in chronological order;
- if everything runs correctly, i.e., if the reaction operation is executed completely, the execution engine executes a save (Save) of the agent's status, which has been changed by the reaction it has executed, a deletion (pop) of the processed notification from the local message queue (3), and a validation of all the operations that have been performed (Commit). All of these operations have changed either the status of the memory, or the status of the message queues (3, 4) and the matrix clock, which is defined below;
- then the execution engine, (1) starts again in the loop in order to process another notification.

This process is distributed among all of the agent servers of the machines. The component Network (12) is responsible for establishing communication between the agent servers. When the agent server is initialized, the potential agents created beforehand are all on the disk in persistent space. When the execution engine (1) sees that it must make a particular agent react because there has been a notification to this agent, it will store it in the memory of the process, possibly from the image saved on the disk. This is the "Load" operation, a movement from the disk to the memory.

Part of the source agent's reaction is to deliver new notifications to the other, so-called target agents. The sending of the notifications is part of the transaction of the reacting source agent server. The possible use of the notification is part of the transaction of the reacting target agent server. The transmission of the notification from the source agent server to the target agent server is not part of the agent's reaction, but is achieved via the channel (2), which executes the following separate transactions:

- a notification sent by an agent through the channel (2) is stored locally in a message queue, i.e., either the local queue (3) (MqIn) for the notifications addressed to a local agent, or the external queue (4) (mqOut) for an agent located in another server;
- at the end of the agent's reaction, the two queues (3, 4) are saved on the disk, together with the reacting agent. The changes in the agent and in the message queues (3, 4) take place in the same transaction, and are established at the same time;
- a function "handleout" of the network Network extracts (15) each notification, in turn, from the external queue (4) (MqOut) and sends it (13) to the target agent server;
- a function "handlein" of the network Network receives (14) the notifications from the other servers and inserts them (15) into the local queue (3) (mqIn) in causal order. When the target agent server receives the message, it stores it in its persistent storage layer (Storage), validates the operation (Commit) and confirms the reception of the message to the source server. Upon reception of this confirmation, the source server deletes the message from its external queue (4) (MqOut). The message is then guaranteed to have been stored persistently by the agent server.

The operations for saving the agent's status, for deleting the processed notification (Save, Pop) and for validating the sent notifications must be intimately linked. The atomicity results from these three operations. It is essential, for example, not to save the agent and leave the notification in the local queue (3), so that the notification is not processed if there is a failure between the two operations. This part must be managed atomically. In order to ensure atomicity between these two operations, the process relies on a persistent external service, which makes it possible to save the agent, the local queue and the external queue simultaneously. Everything is kept in the same persistent service that provides this atomic operation. When changes are made, the persistent service saves the old version of the files, and when the validation operation "commit" is called in this persistent service, it is the persistent service that ensures that the operation is executed atomically. The atomicity includes the modifications in the agent, but also the messages it has sent to the outside and the message it has used. Three things are executed atomically.

If a problem occurs during the reaction, the changes in the database are cancelled (Rollback). Depending on the type of error, it may be necessary to perform additional operations in order to re-synchronize the database and the objects of the memory, and to allow the program to continue. Two types of errors can occur. The errors of the first type are detected in the code of the source and signaled by an "exception" in C++. The serious errors (second type) result in a signal that makes them apparent. In the first case, the exception can be handled at any time, even partially. Two cases can be distinguished by the source of the exception. If the exception has been raised during the agent's reaction, the agent is marked as having failed, the operations in the database are cancelled and the message queue is re-stored. The execution engine (1) can process the next notification. If not, the exception either represents an expected signal, in which case the corresponding notification is created and sent, or it is id the occurrence of a serious error. In this case, the processing of an error signal depends on the position in the loop at which it has been signaled. If the error occurs during the agent's reaction to a notification, then it is processed in the same way as an exception would be at this moment. If the error results from the analysis of the notification or from the loading of the target agent, then the notification is ignored.

The algorithm (6) of the agent machine manages the distribution of the notifications to all the entities in the network, and the reliability of these operations, especially their scheduling. It ensures that the messages have actually been delivered to the destination agents in the order in which they were sent. The relationship between the notifications is established simply by numbering the messages, by incrementing a logical clock. A logical clock makes it possible to obtain a certain number of properties (the causality property of the channel, for example).

A matrix clock is included in each message, and each time a message is received, a part of the algorithm will first read the position of the clock.

A message is an object that contains four pieces of information: the identifier of the sending agent, the identifier of the destination agent, a clock, and the notification. If there are n sites, the clock is composed of a matrix n×n, since the status of the communication of each site with each other site must be maintained. Each machine will try to maintain its own view of the global communications, even the communications between two other machines. A matrix n×n corresponds to a very high-volume piece of information. An optimization of the transferred data is performed. A part of the sending algorithm calculates the part of the clock actually used and transfers only this part.

Thus, the invention provides the agent machine with the property of failure resistance, since a large process is divided into small elementary processes. In particular, it applies to Data Warehousing and to the distribution of the process. The data transforming and routing process is broken down into elementary steps. In a distributed process, several machines are impacted and the risk of a machine or network failure is high. Breaking the process down into steps makes it possible to isolate one piece in particular, i.e., the transmission of the notification from one machine to another.

The agent machine is distributed. The agent machines communicate with one another; the agents do not see this distribution since they communicate via notifications and address their local agent machine. An agent's reaction remains local. The atomic reaction, which is to change the status and to send other notifications, remains local. Thus, none of the network failures have any influence on this reaction. Moreover, the transmission of the notifications itself is an atomic operation. Each notification sent is an atomic operation, which makes it possible to handle network failures by saving the notifications while waiting for the machine or the network to return to normal operation. Transmission errors, site failures and network failures are handled at the agent machine level.

A notification is something asynchronous. When a notification is sent, the program can continue in an asynchronous mode. When the notification is sent, it is certain that it will be received and that the consequence of the message that has been sent will be executed, and there is no need to wait for the exact result. This corresponds to the property of atomicity in the delivery of the messages and in the order of delivery of the messages. With the rescheduling of the messages in causal order, and with the reliability of the delivery of the messages, the sender can completely rely on the properties provided, so as not to have to re-synchronize in order to be sure that the operations will be able to be executed in the correct order. Thus, the handling of data errors is eliminated from the program.

Guaranteeing this reliability of the network, and this scheduling at the agent machine level, makes it possible to extract a relatively simple status graph, which is easy to handle since includes only the applicable errors. The event level (Agent Event) provides something of a structure for the various statuses passed through, and makes it possible, in particular, to handle the errors that are currently applicable at this level, which can occur at each step. The applicable errors are handled by the status automation. By breaking things down into elementary operations (transfer step, loading step), and by having a controller that reacts correctly, for which there is a certainty of its reacting correctly, it is possible to identify the step and to restart this step only.

The agent Event is an agent specific to Data Warehousing. The agent machine according to the invention can therefore be used in the Data Warehousing field by manipulating this specific agent as defined in the invention. Of course, the agent machine can be used in other fields, using agents specific to each of these fields. For example, the agent machine can be used in the firewall field (Netwall). A firewall authorizes or inhibits connections to a network, and all the information related to the actions it executes are placed in a log, a file (Log) whose size increases rapidly. The process according to the invention can be rewritten in another language, and can be used to manage this file (Log) using agents specific to the firewall field (NetwallEvent). These specific agents use the same model for changing the status of the agent "Event" specific to Data Warehousing, but are adapted for managing data of the file type specific to the application of the fire wall.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

What is claimed is:

1. A process for transforming and routing data between agent servers in one or more of a plurality of first machines and a central agent server of a second machine, wherein an agent server comprises autonomous agents that communicate via messages, each message having at least a notification, and wherein each agent belongs to one type of agent and is designated by an agent identifier, the agents being shared out into at least two types, with each type of agent handling only one type of notification, the agent server also comprising a storage layer and an agent machine having an execution engine, a communication channel and two message queues associated with the notifications, namely, a local queue and an external queue, the process comprising taking a notification from the local queue, by the execution engine, determining and loading a corresponding agent by its agent identifier for each notification, depending on which type of agent is required to handle the notification, causing the agent to react to the notification, such that the agent can then change its status and send addressed notifications to the communication channel, storing the notifications in the local queue if said notifications are addressed to a local agent and in the external queue if said notifications are addressed to an agent of another server.

2. A process for transforming and routing data according to claim 1, characterized in that the execution engine of the agent machine executes, after the agent's reaction, a save of the agent's status, a deletion of the processed notification from the local message queue, and atomically, a validation of various operations performed that have changed either the status of the agent or the status of the message queues.

3. A process for transforming and routing data according to claim 1, characterized in that each message includes an optimized matrix clock that can be read by the execution engine of the agent machine, thus making it possible to process the notifications in their causal sending order.

4. A process for transforming and routing data according to claim 2, characterized in that each message includes an optimized matrix clock that can be read by the execution engine of the agent machine, thus making it possible to process the notifications in their causal sending order.

5. A process for transforming and routing data according to claim 1, characterized in that a message is an object that contains four pieces of information, including an identifier of the sending agent, an identifier of the destination agent, a clock and the notification.

6. A process for transforming and routing data according to claim 1, characterized in that the agent machine manages distribution to all entities of the network, reliability of operations, and scheduling of messages which is established by incrementing a logical matrix clock.

7. A process for transforming and routing data according to claim 1, characterized in that the communication channel performs the following separate transactions:

storing a notification sent by an agent locally, either in the local queue for notifications addressed to a local agent, or in the external queue for an agent located in another server;

at the end of the agent's reaction, saving the two queues on a disk, together with the reacting agent;

extracting by a first function of the network each notification, in turn, from the external queue and sending the extracted notification to a targeted agent server;

receiving the notifications from the other servers by a second function of the network and inserting the notifications into the local queue in causal order.

8. A process for transforming and routing data according to claim 1, characterized in that when a targeted agent server receives a message, the targeted agent server stores the message in a persistent storage layer, validates the operation and confirms the reception of the message to a source server; and upon reception of this confirmation, the source server deletes the message from the external queue of the source server.

9. A process for transforming and routing data according to claim 1, characterized in that a persistent external service ensures the atomicity of the operations that have changed either the status of the agent or the status of the message queues.

10. A process for transforming and routing data according to claim 1, characterized in that the execution engine includes a program that:

takes a notification that is in the local queue, using a Get function;

identifies which agent the notification is addressed to;

loads the identified agent corresponding to the notification;

causes the agent to react by calling a reaction operation such that the agent can change its status by modifying its image in memory, and can send notifications by addressing the channel that will distribute the notification, in which case the notifications are routed to a message queue where they are stored in chronological order;

if the reaction operation is executed, saves the status of the agent, which has been changed by the reaction it has executed, deletes the notification that has been processed, and validates all of the operations that have been performed; and starts again in the program loop in order to process another notification.

11. A process for transforming and routing data according to claim 1, characterized in that the process is executed between agent servers present in machines of production sites and a central agent server present in a machine of a decision-making base, and uses a particular agent that describes specific events, in which a status controller is implemented.

12. A process for transforming and routing data according to claim 11, characterized in that the status controller comprises various statuses including:

a None status in which the event is not active;

a notification status that causes the event to pass into a Wait status in which the event waits for its activation condition to become "true"; at which time the event delivers itself a notification that changes the event to an Init status;

a first simple event status that attains a Run status directly and executes its action;

a first composed event status that indicates to sub-events agreement for the sub-event to start and waits for the first of the sub-events to attain a Run status in order for the composed events to pass into the Run status;

a second simple event which then passes into a Done or Fail status, depending on the status of the simple event action;

a second composed event, which passes in the Done status on the execution statuses of all the sub-events;

an event in execution status that can be killed by sending to the event in execution status a notification, in which case the event passes into a Kill status, marking the fact that the event has been killed, and then to a Stop status when it has actually been killed;

a terminated event, i.e., in the Done, Fail or Stop status that can be re-executed by a client by sending the event a notification, in which case the event is reset and passes into the Wait status; the event then propagates the notification to all the sub-events; an event executed repeatedly and endowed with a Done status is automatically reset by an agent Scheduler, which sends the event a notification; and an event in the Fail or Stop status can be re-executed without being reset by sending a notification, and when this condition becomes "true," the event restarts at the point at which it was previously stopped.

13. A process for transforming and routing data according to claim 12, further comprising adding a new function by adding an agent class derived from the class "Event."

14. A process for transforming and routing data according to claim 11, characterized in that three categories of "Event" type agents—"SeqEvent," "ParEvent" and "complexEvent"—take on elementary operations of the "Event" type in order to respectively execute them in sequence, in parallel, or in accordance with the dependencies between the various operations.

* * * * *